US009069905B2

(12) United States Patent
Olszta et al.

(10) Patent No.: US 9,069,905 B2
(45) Date of Patent: Jun. 30, 2015

(54) TOOL-BASED TESTING FOR COMPOSITED SYSTEMS

(75) Inventors: Pawel W Olszta, Redmond, WA (US); Deepali A Bhagvat, Redmond, WA (US); Imran Ali, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 90 days.

(21) Appl. No.: 13/550,431

(22) Filed: Jul. 16, 2012

(65) Prior Publication Data
US 2014/0019940 A1    Jan. 16, 2014

(51) Int. Cl.
G06F 9/44        (2006.01)
G06F 11/36       (2006.01)

(52) U.S. Cl.
CPC ................... *G06F 11/3692* (2013.01)

(58) Field of Classification Search
None
See application file for complete search history.

(56) References Cited

U.S. PATENT DOCUMENTS

| | | | | |
|---|---|---|---|---|
| 6,633,878 | B1 * | 10/2003 | Underwood | 1/1 |
| 6,701,514 | B1 * | 3/2004 | Haswell et al. | 717/115 |
| 7,533,371 | B1 * | 5/2009 | Johns et al. | 717/130 |
| 7,716,684 | B2 * | 5/2010 | Singhal et al. | 719/328 |
| 7,839,419 | B2 | 11/2010 | Hanggie et al. | |
| 7,937,452 | B2 | 5/2011 | Wynn et al. | |
| 2004/0189669 | A1 * | 9/2004 | David et al. | 345/619 |
| 2005/0088436 | A1 * | 4/2005 | Swedberg et al. | 345/420 |
| 2005/0229108 | A1 * | 10/2005 | Sadek et al. | 715/764 |
| 2006/0284834 | A1 * | 12/2006 | Itkowitz et al. | 345/156 |
| 2007/0074217 | A1 * | 3/2007 | Rakvic et al. | 718/102 |
| 2008/0104601 | A1 * | 5/2008 | Kaneko et al. | 718/103 |
| 2008/0235352 | A1 | 9/2008 | Yolleck et al. | |
| 2009/0015888 | A1 * | 1/2009 | Chen et al. | 358/522 |
| 2009/0282401 | A1 * | 11/2009 | Todorova | 717/175 |
| 2010/0083192 | A1 * | 4/2010 | Zaman et al. | 715/866 |
| 2010/0088194 | A1 * | 4/2010 | Sierer et al. | 705/26 |
| 2010/0125844 | A1 * | 5/2010 | Mousseau et al. | 718/1 |
| 2010/0131937 | A1 * | 5/2010 | Misra et al. | 717/151 |

(Continued)

OTHER PUBLICATIONS

Wu, et al., A Web 2.0-Based Scientific Application Framework, ICWS '10 Proceedings of the 2010 IEEE International Conference on Web Services, Jul. 5, 2010, 2 pages.

(Continued)

*Primary Examiner* — Don Wong
*Assistant Examiner* — Roberto E Luna
(74) *Attorney, Agent, or Firm* — Timothy Churna; Kate Drakos; Micky Minhas

(57) ABSTRACT

Tool-based testing of composited systems indirectly tests properties of a dynamic linked library for a desktop compositor such as DWMCore.dll via an algebraic structure of tools that define composition and rendering properties and derive equivalent resource models. The system tests for undesired side effects by examining characteristics of pixels from complicated render operations and employs a framework to test the composition and rendering of Desktop Windows Manager directly on the DWMCore.dll Application Programming Interface. The process includes mimicking uDWM.dll behavior by using resources with test patterns to take controlled measurements and validate primitives. The framework includes an infrastructure, a resource model, and tools. Each tool exposes a different composition or rendering property. A tool combinator exposes high level composition properties, including correct overlapping of transparent content and visual transformation (translation, scale, color transforms, etc.) by taking tools as input and using visual tree constructs to combine them.

18 Claims, 6 Drawing Sheets

(56) References Cited

U.S. PATENT DOCUMENTS

| | | | |
|---|---|---|---|
| 2010/0242028 A1* | 9/2010 | Weigert | 717/131 |
| 2010/0280863 A1* | 11/2010 | Wilcock et al. | 705/7 |
| 2011/0047449 A1 | 2/2011 | Polakam et al. | |
| 2011/0072391 A1* | 3/2011 | Hanggie et al. | 715/800 |
| 2011/0178866 A1 | 7/2011 | Levine et al. | |
| 2011/0197197 A1 | 8/2011 | Ni et al. | |
| 2012/0084713 A1* | 4/2012 | Desai et al. | 715/788 |
| 2012/0324420 A1* | 12/2012 | Collinson | 717/105 |

OTHER PUBLICATIONS

Gite, Download Google Gadgets for Linux, Jun. 4, 2008, <<http://www.cyberciti.biz/tips/download-google-gadgets-for-linux.html>>, 4 pages.

* cited by examiner

TOOL-BASED TESTING FOR COMPOSITED SYSTEMS

BACKGROUND

When myriad developers create applications, visual verification tests of these applications is typically time consuming and resource intensive due to the need for human confirmation of test results falling outside of specified parameters. For example, when a developer submits a new graphics card driver, user-mode test programs rely on comparison of master images to output from the driver to test the driver. When the user-mode test program identifies a divergence from the master image, the user-mode test program files a bug report, and human intervention is required to address the bug.

In many cases, the divergences do not actually represent problems, but instead represent false positive reports of bugs due to round off errors, hardware differences, or non-human-perceptible color changes introduced by the new driver. Nevertheless, a human has to review the output to determine whether a problem actually exists due to the new driver, which is expensive in terms of dollar-cost and time.

Desktop Window Manager (DWM) is part of the Windows™ operating system and is a full screen DirectX™ application that takes advantage of hardware acceleration and includes a desktop compositor and a window manager. The window manager takes care of window operations such as scrolling, resizing, moving, minimizing, maximizing and so on. The window manager also enables different window types such as layered windows, popup windows and so on.

When DWM is running, applications do not draw directly to the video memory but to an off-screen buffer, called a surface. The desktop compositor then takes surfaces for all the applications running on Windows, composes the entire desktop and renders using DirectX™ runtime. The compositor uses various primitives to render different parts of the desktop. It represents parts of each window such as client area, buttons, title bar and so on using a two-dimensional (2D) mesh. The actual mesh used by the compositor is complex to render effects such as rounded corners and shadows, and the mesh is textured using bitmaps. These bitmaps can be off-screen surfaces drawn by the application or parts of the theme texture. For example, the non-client area of the windows that are part of the composited desktop can be rendered to present a glass-like or other textured appearance. The superbar, which can enclose the address bar and the navigation buttons, can also be rendered to present the glass-like or other textured appearance. The compositor also uses a solid color brush. For example, a semi-transparent black brush can be used to dim the wallpaper.

In addition, various visualization elements, including composition and rendering primitives as exposed by DWMCore.dll, are not accessible via the Desktop Window Manager (DWM) API surface to consume in a user mode test suite. Such primitives often have complicated semantics, and validation of the primitives' behavior is problematic. DWMCore.dll and its precursor MILCore.dll represent examples of dynamic linked libraries that a desktop compositor uses to create user interface graphics.

The difficulties in testing primitives are exacerbated due to the large number of primitives, and because they can be arbitrarily arranged, this leads to a combinatorial explosion of possible test scenarios. In addition, not every test scenario is useful for each composition, and there is little indication of which of the possible test scenarios will be useful. Traditionally, validating the rendering of primitives requires a previously created database of master images against which the test is run. These master images must be refreshed frequently, and differences during validation due to floating point errors often lead to false indications of failure.

SUMMARY

Tool-based testing of composited systems as described herein does not rely on master images and replaces the concept of colored images in user-mode testing with a representation that is less reliant on human intervention. In particular, tool-based testing of composited systems, as described herein, tests composition and rendering properties of the dwmcore.dll. Tool-based testing of composited systems introduces an algebraic structure of tools and tool combinators, defines the composition and rendering properties of the tools and tool combinators, and demonstrates how to derive equivalent resource models rather than manipulating the resource model directly to create useful testing scenarios. By examining characteristics of pixels from complicated render operations, tool-based testing as described herein tests for undesired side effects of the operations while disregarding side effects that are not human perceptible.

Tool-based testing of composited systems employs a framework to test the composition and rendering of Desktop Windows Manager (DWM) directly on top of the dynamic linked library, such as DWMCore.dll's Application Programming Interface (API) set. The described tool-based testing process provides a convenient representation of the dynamic linked library resource model and controls composition. The described tool-based testing process includes creating tests that mimic uDWM.dll behavior by using resources with the test patterns to take controlled measurements and validate composition and rendering primitives.

The described tool-based testing test framework includes three parts: infrastructure, resource model, and tools. Tools control composition by driving the resource model which in turn uses the infrastructure to communicate with dynamic linked libraries that a desktop compositor uses to create user interface graphics, such as DWMCore.dll.

Each of the tools exposes a different composition or rendering property. It is not necessary for a tool to focus on any particular feature. Instead, tools mimic real-world usage scenarios for the dynamic linked libraries such as DWMCore.dll. The described tools strike a balance between relevance of the scenario and ease of providing results validation.

One type of tools, called tool combinators, expose higher level composition properties, such as correct overlapping of transparent content or visual transformation (translation, scale, color transforms, etc.). Tool combinators take a number of tools as input and use visual tree constructs to combine them together in a meaningful way.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The terms "techniques" or "facility," for instance, may refer to device(s), system(s), method(s) and/or computer-readable instructions as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

The tool-based testing framework described herein includes three distinct parts: infrastructure, resource model and tools. Tools control composition by driving the resource model. In turn, the resource model uses the infrastructure to communicate with DWMCore.dll. DWMCore.dll and the precursor MILCore.dll represent examples of dynamic linked libraries that desktop compositors use to create user interface graphics.

The process and systems described herein may be implemented in a number of ways. Example implementations are provided below with reference to the accompanying figures.

Illustrative Environment

Figure 1:
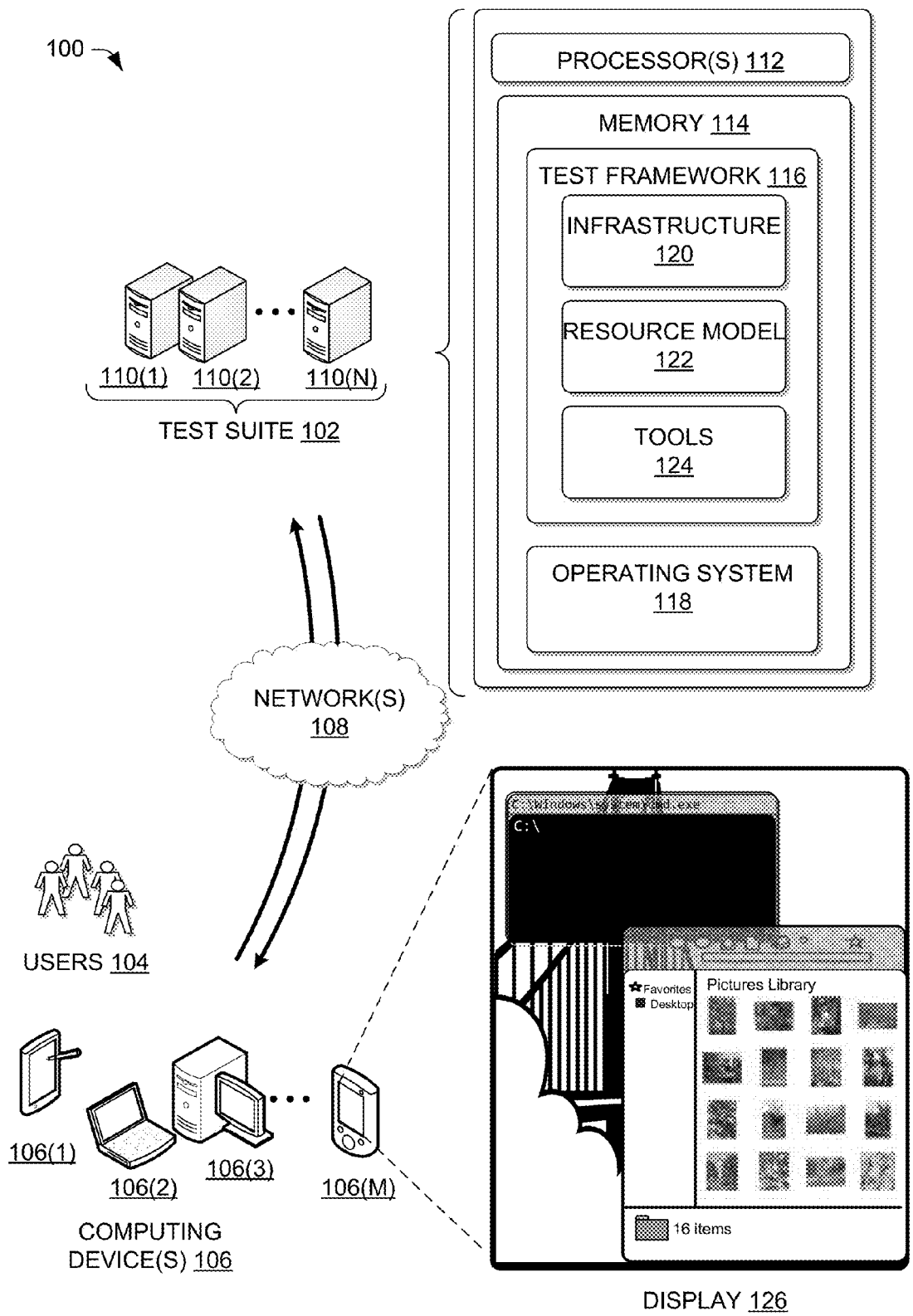
FIG. 1 is a schematic diagram of an environment that includes a tool-based testing framework.

FIG. 1 is a schematic diagram of an environment illustrating a tool-based testing test framework that includes infrastructure, resource model, and tools. The environment 100 may include a user mode test suite 102, which includes test machines and programming to provide test results to users 104 via computing devices 106 in response to user-initiated requests or when test results exceed predefined parameters. The test suite 102 may be operating on one or more of the computing devices 106 or the test suite 102 may be in communication with the computing devices 106 via one or more network(s) 108. In some embodiments, the test suite 102 may be a local machine that is used directly by the users 104.

In accordance with various embodiments, the test suite may be hosted by various servers, such as servers 110(1), 110(2), . . . , 110(N). For example the servers 110(1)-(N) may be configured as a server farm, among many other possibilities. The test suite 102 may be configured to receive as input content information from applications to create a composited rendering via user-initiated requests from the users 104 via the computing devices 106. The test suite 102 may be configured to run tests on the composition and rendering properties of a dynamic linked library for a desktop compositor, such as DWMCore.dll, and to return test results based on the user requests. In another example, the test suite 102 may be configured to automatically receive as input content information from applications to create a composited desktop through an application submission system, via the computing devices 106. In this example, the test suite 102 may be configured to run tests on the composition and rendering properties of dwmcore.dll, and to return test results for each application. In another example, test results may only be returned to a user submitter or test manager when the results exceed a predetermined parameter.

As illustrated, the test suite 102 is equipped with one or more processors 112 and memory 114. The memory 114 may store applications, modules, and/or data. In some embodiments, the memory 114 may include a test framework 116 and/or operating system 118, which may facilitate tool-based testing of composited systems.

Although illustrated in FIG. 1 as being stored in memory 114, in some implementations, test framework 116, or portions thereof, can be stored on one or more servers and/or executed via a cloud based implementation accessible by test suite 102. In addition, in some implementations, test framework 116, or portions thereof, can be implemented using any form of computer-readable media that is accessible by a computing device 106. Furthermore, in some embodiments, one or more components of test framework 116 may be implemented as part of an integrated circuit that is part of, or accessible to, test suite 102 or a computing device 106.

Computer-readable media, as the term is used herein, includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media exclusive of any of the hardware components necessary to perform transmission.

The test framework 116 may include a number of modules such as an infrastructure module 120, a resource model module 122, and a tools module 124. Collectively, the modules may perform various operations to isolate high-level scenario setup, test graphics infrastructure integration, and perform indirect validation of composition and rendering features provided by dwmcore.dll. Each of these modules is described in turn.

In accordance with one or more embodiments, the infrastructure module 120 communicates with the dynamic linked library for a desktop compositor, such as DWMCore.dll, and creates a render target. The test framework 116 communicates with dynamic linked library for a desktop compositor directly by forming a dedicated channel using the infrastructure module 120 of the framework. The infrastructure module 120 creates a mock surface and mock surface manager, initializes the partition manager, initializes the connection manager, creates transport parameters, and opens a channel to the dynamic linked library for a desktop compositor. These actions also create a separate partition in the dynamic linked library for a desktop compositor, which stores the resources associated with the tool-based testing framework.

Once a channel is formed between the test framework 116 and dynamic linked library for a desktop compositor, such as DWMCore.dll, the infrastructure module 120 creates a desktop render target. The desktop render target acts as the root of a visual tree, which represents various parts of the top level windows on the desktop.

In accordance with one or more embodiments, the resource model module 122 adds nodes to the visual tree in order to render primitives. The resource model module 122 also creates render data and other resources corresponding to each visual. In addition, the resource model module 122 sends draw instructions to cause rendering of the primitives.

In accordance with one or more embodiments, the tools module 124 drives the resource model and creates an oracle for rendering. The tool-based testing framework 116 indirectly tests composition and rendering properties of dwmcore.dll. The tool-based testing framework 116 uses an algebraic structure of tools and tool combinators in the tools module 124 to define composition and rendering properties and to derive equivalent resource models rather than manipulating the resource model directly to create test scenarios such as that shown on display 126.

Figure 2:
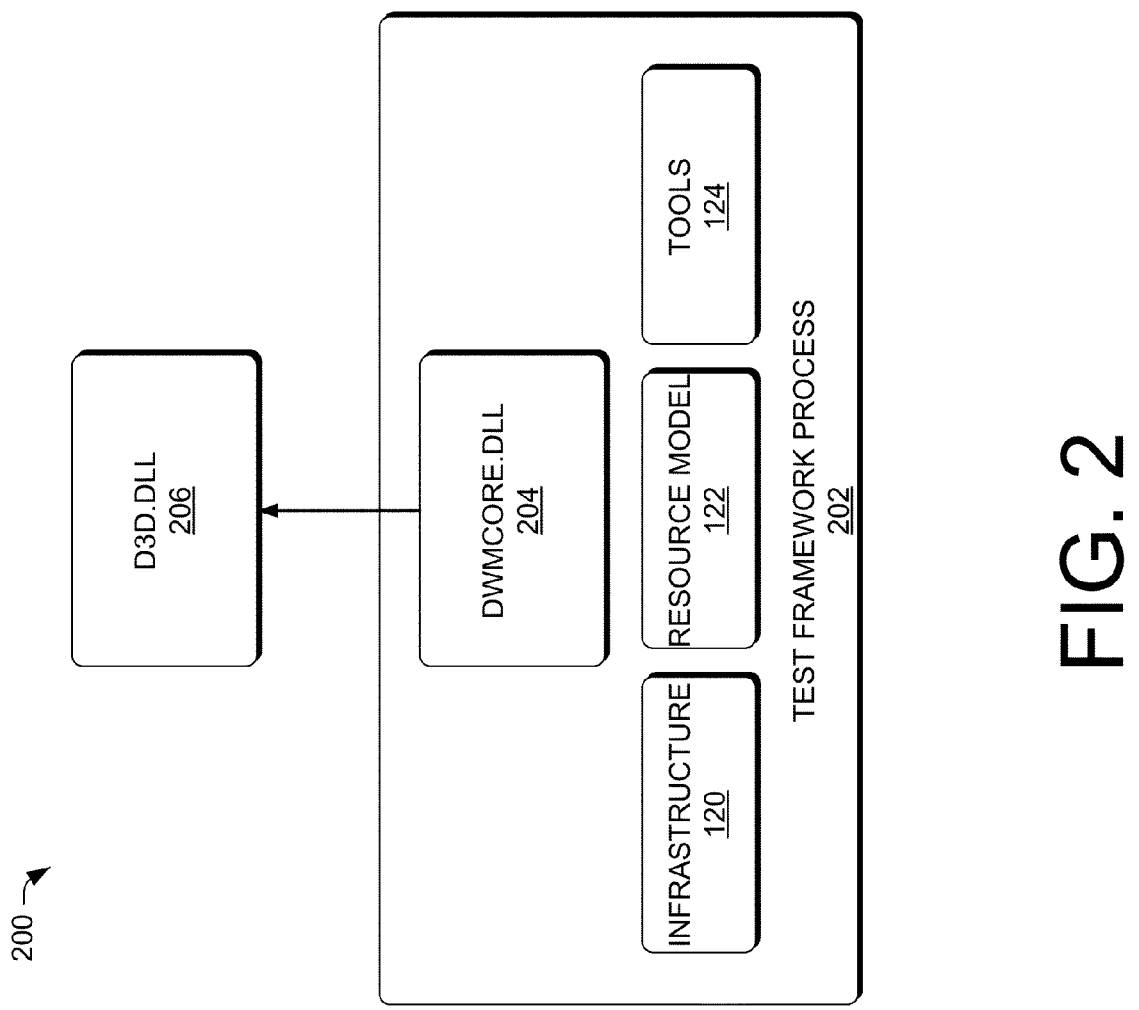
FIG. 2 is a schematic diagram of an illustrative test framework process hosting as an example, the dynamic linked library for a desktop compositor, DWMCore.dll.

FIG. 2, at 200, is a schematic diagram of an illustrative test framework process 202, which directly hosts a dynamic linked library for a desktop compositor, such as DWM-Core.dll, within the process and tests the composition and rendering of a desktop windows manager, (DWM) on top of the API set for the dynamic linked library for a desktop compositor, such as DMWCore.dll, 204. This test framework process 202 provides a convenient representation of a dynamic linked library for a desktop compositor resource model and provides for controlling composition. The test framework provides a facility for creating tests that mimic uDWM.dll behavior while using resources with the test patterns which enables fine control of measurements and validating of composition and rendering primitives. The dynamic linked library for the desktop compositor 204 can also call multiple DirectX™ dlls, which are named based on the DirectX™ version, such as d3dx10_Test.dll or d3dx11_Test.dll and DXGIDebug.dll. For example, DWM-Core.dll 204 can call D3D.dll 206, which can present the test scenario on a screen such as display 126.

As a part of test framework 116, infrastructure 120 enables test framework process 202 to communicate directly with the dynamic linked library for the desktop compositor 204 by forming a dedicated channel. Infrastructure 120 performs operations including creating a mock surface manager, initializing the partition manager, and setting up a render target. When infrastructure 120 opens a channel, infrastructure 120 also creates a separate partition in the dynamic linked library for the desktop compositor 204, which stores each of the resources associated with the test framework 116.

In various embodiments, infrastructure 120 employs a variety of APIs and classes to form the channel. Infrastructure 120 can use APIs to initialize a global partition manager, to create a mock surface manager and a mock surface, to initialize the connection manager, to create transport parameters, to create a connection, to create a channel, to associate the channel with the partition, and to register the partition for the surface manager updates. In at least one embodiment, infrastructure 120 uses hosting and core classes, as well as counterpart native classes, to provide an implementation of the surface manager interfaces.

Responsive to the infrastructure 120 forming a channel between the test framework 116 and the dynamic linked library for the desktop compositor, such as DWMCore.dll 204, infrastructure 120 creates a desktop render target. For example, infrastructure 120 uses a class to create a resource, create a pop-up window, create the desktop render target of an identified size and color at an identified location using the created resource and pop-up window, create a visual corresponding to the created desktop render target, and set the visual as the root of a visual tree.

Resource model 122 includes builder classes to build and manage visual and render-data trees, resource classes to create and update composition resources, and render data instruction classes to draw composition primitives. In various embodiments, resource model 122 uses a variety of classes to add nodes to a tree of visuals, create render data and other resources corresponding to each visual, and send draw instructions to render the primitives. Actions resource model 122 takes to build a tree of visuals are discussed in more detail below with regard to FIG. 3.

In various embodiments, tools 124 drive the resource model 122 and create an oracle for rendering. Dynamic linked libraries that desktop compositors use to create user interface graphics, such as DWMCore.dll, come with a breadth of composition and rendering primitives that can be arbitrarily arranged. Such an arbitrary arrangement leads to a combinatorial explosion of possible test scenarios that provide little indications of which test scenario will be useful, and which test scenario will not be useful. In addition, the primitives exposed by such dynamic linked libraries usually have complicated semantics such that validating the behavior of the primitives is difficult. Accordingly, tools 124 indirectly test composition and rendering properties of such dynamic linked libraries, such as DWMCore.dll. Instead of manipulating the resource model directly to create scenarios, tools test framework process 202 uses an algebraic structure of tools and tool combinators 124, defines the composition and rendering properties of the created scenarios, and derives appropriate resource models 122. Each tool 124 exposes a different composition or rendering property. Rather than a tool 124 focusing on a particular feature, tools 124 mimic real world usage scenarios for DWMCore.dll 204 while striking a balance between relevance of the scenario and ease of validating results.

Tools 124 validate output of dynamic linked libraries for a desktop compositor, such as DWMCore.dll, against oracles generated on-the-fly, which means in real time or near real time. Tools 124 creating an oracle for rendering on-the-fly eliminates the need for a huge database of images, which necessarily include an image per primitive, per combination, and per resolution. Moreover, by tools 124 creating an oracle for rendering on-the-fly, the dynamic linked library for the desktop compositor's rendering can be modified without the need for regeneration of master images to test against.

In one example implementation, a tool representing glass over a bitmap, such as GlassOverBitmap Tool 124, verifies blur quality and colorization correctness. A Glass Oracle calculates the Gaussian matrix at run time using a blur radius and sigma. The Glass Oracle convolutes part of the bitmap that lies beneath a glass region with this Gaussian matrix to calculate the blur. Test framework 116 uses this expected rendering to verify the actual rendering of GlassOverBitmap Tool 124 by the dynamic linked library for a desktop compositor, such as DWMCore.dll. In various embodiments both the expected and actual renderings are converted from the RGB color space to the CIELab color space and one or more pixels are compared to determine whether the difference between corresponding pixels exceeds a threshold of human perception. In previous systems, absent such a comparison, slight changes in color that registered as a bug due to floating point errors, although these changes were not noticeable, lead to false positive reports of bugs, which required inordinate resources to check and resolve.

Figure 3:
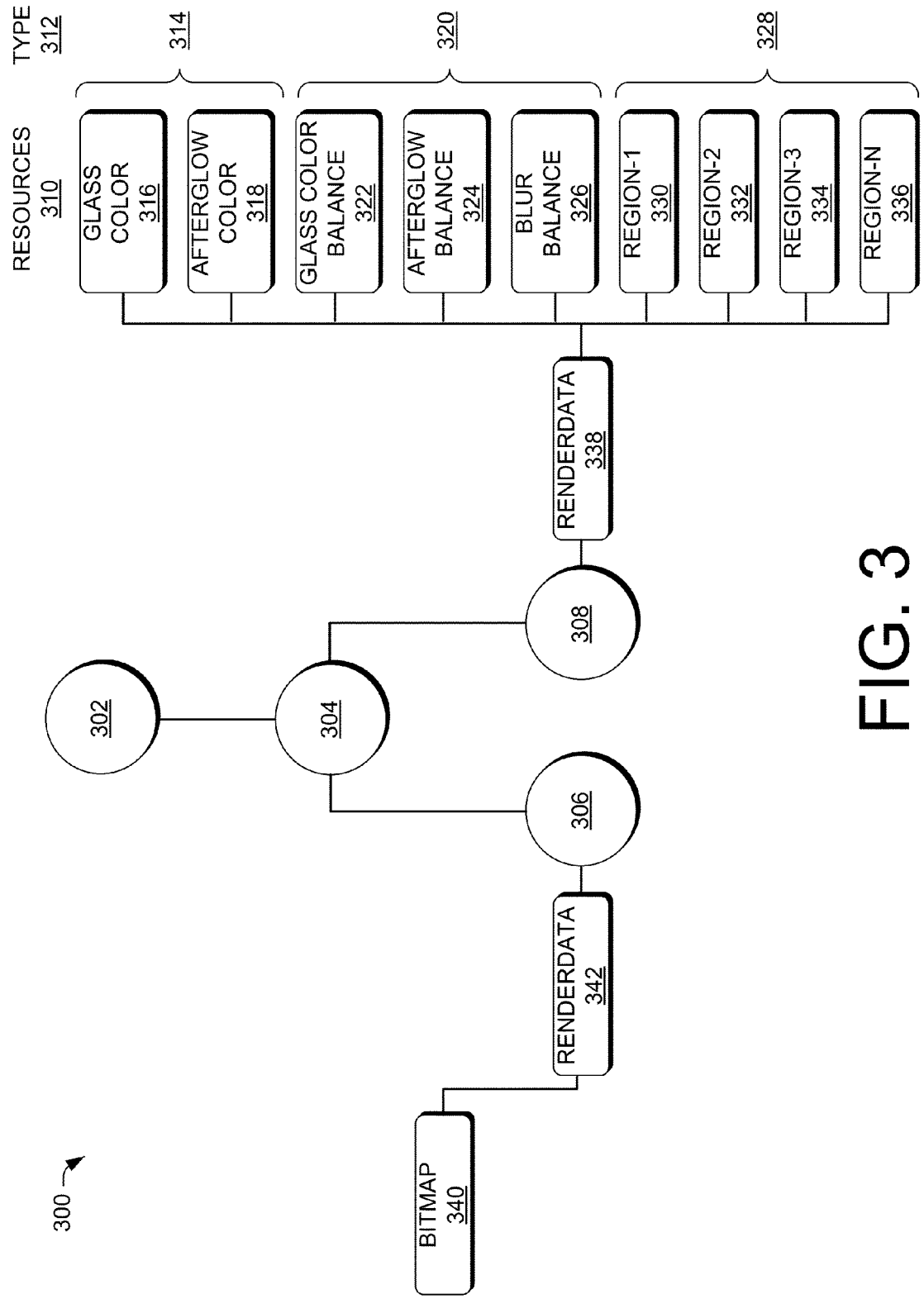
FIG. 3 is a schematic diagram of a resource graph for an example scenario of glass over bitmap.

FIG. 3 is a schematic diagram of a resource graph. The illustrated example scenario 300 represents a glass-over-bitmap scenario. However, tool-based testing of composited systems can be used to test a multitude of other graphical scenarios.

Resource model 122 creates visual nodes starting with node 302, which represents a render-target visual. Resource model 122 uses a class to create a visual node 304 and to add the visual node 304 to the visual tree as a child of the render target visual node 302. Resource model 122 uses the class to create additional visual nodes 306 and 308 and to add the visual nodes 306 and 308 to the visual tree as children of visual node 304.

In the illustrated example, resource model 122 uses a visual artifact class, such as CoreVisualArtifact class, to create a visual and a tree builder class, such as VisualTreeBuilder class, to add the created visual 304 to the visual tree as a child of the render target visual 302. Resource model 122 uses the visual artifact class to create additional visual nodes corresponding to bitmap and glass and the tree builder class to add the created bitmap visual 306 and glass visual 308 to the visual tree as children of the created visual 304.

Using another class, resource model 122 can create a variety of resources 310 of various types 312 to which the visuals refer. In the illustrated implementation, a color artifact class, such as CoreColorArtifact class, creates color-type resources 314 for glass color 316 and afterglow color 318 and sets the value for the glass color and afterglow resources by sending a set-content command. A double artifact class, such as CoreDoubleArtifact class, creates double-type resources 320 for glass color balance 322, afterglow balance 324, and blur balance 326 and sets the value for the glass color balance, afterglow balance, and blur balance resources by sending a set-content command. A path geometry class, such as CorePathGeometryArtifact class, creates path geometry type resources 328 for glass geometries in various regions such as region-1 330, region-2 332, region-3 334, to region-N 336. The path geometry class also sets the value for the glass geometries according to region by sending a set-content command.

Resource model 122 uses another class to create a resource type for rendering data 338 and to add it to the visual tree. In the illustrated example, resource model 122 uses a render data class, such as CoreRenderData class, to create the resource renderdata 338, which will be used to render glass, and a builder class, such as RenderDataBuilder class, adds resource renderdata 338 to the visual tree. The visual artifact class sets the resource render data 338 on the glass visual 308 by sending a set-content command. In order to render glass, a render data artifact class, such as CoreRenderDataArtifact class, sends a render data command and a drawing instruction artifact class, such as DrawGlassInstructionArtifact class, sends a draw glass command with pointers to resources 310.

Resource model 122 uses another class to create a resource type for a bitmap 340 and to add it to the visual tree. In the illustrated example, resource model 122 uses a bitmap artifact class, such as CoreBitmapArtifact class, to create the bitmap-type resource 340, which will be used to render a bitmap, and to initialize the bitmap with a test image. A render data artifact class, such as CoreRenderDataArtifact class, creates a renderdata-type resource 342 to render the bitmap and adds the renderdata-type resource 342 to the visual tree.

To render a bitmap, the render data artifact class sends a render-data command and a bitmap drawing instruction class, such as DrawBitmapInstructionArtifact class, sends a draw-bitmap command with a pointer to the bitmap resource 340.

To summarize, resource model 122 includes a variety of builder classes such as a visual-tree builder class and a render-data builder class. Resource model 122 uses various artifact classes as resource classes to create and update a composition resource. Examples of artifact classes that resource model 122 can use to create and update composition resources include, but are not limited to, a core-color artifact, core-double artifact, core-path-geometry artifact, and core-bitmap artifact. Resource model 122 uses various artifact classes as resource classes to create and update common visual and render-data resources. Examples of artifact classes that resource model 122 can use to create and update common visual and render-data resources, respectively, include core-visual artifact class and core-render-data artifact class. The resource model also contains render data instruction classes that are used to draw a composition primitive.

Tools 124 drive the resource model 122 and create an oracle for rendering as described in more detail below regarding FIGS. 4, 5, and 6.

Illustrative Operation

Figure 4:
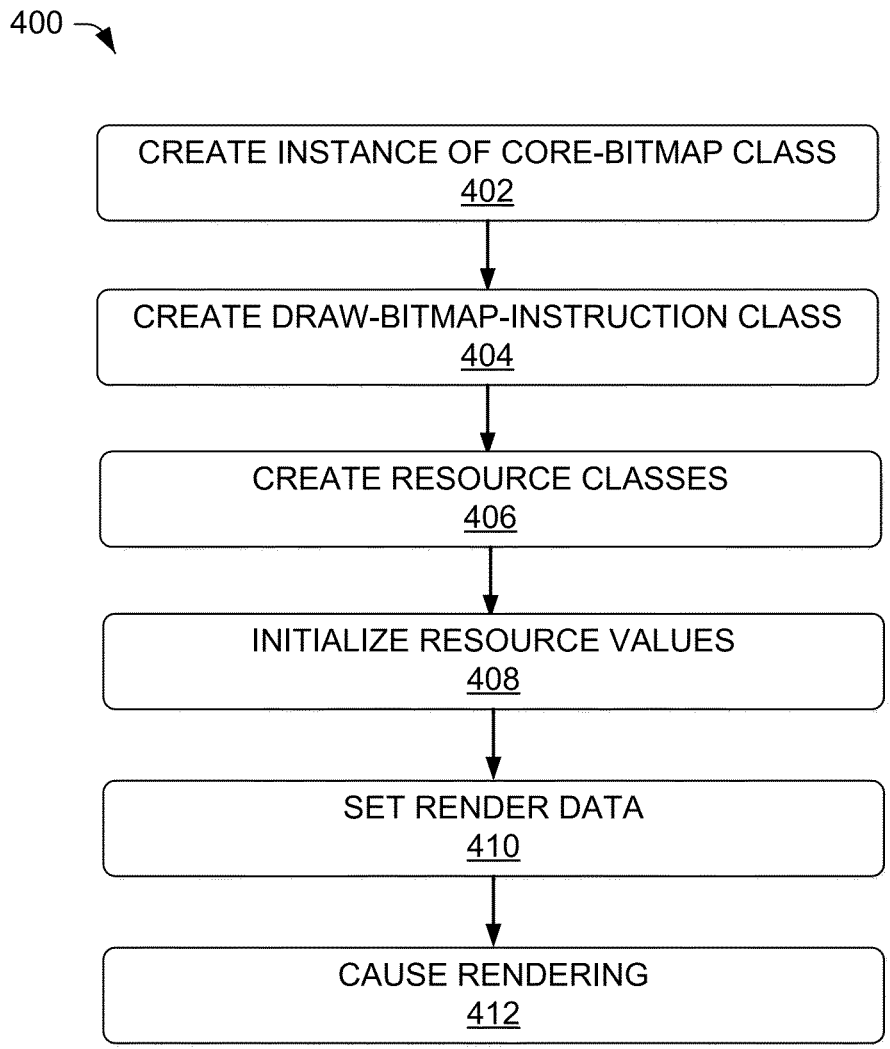
FIG. 4 is a flow diagram of an illustrative process of tool-based testing of composited systems applied to rendering of a bitmap.
Figure 5:
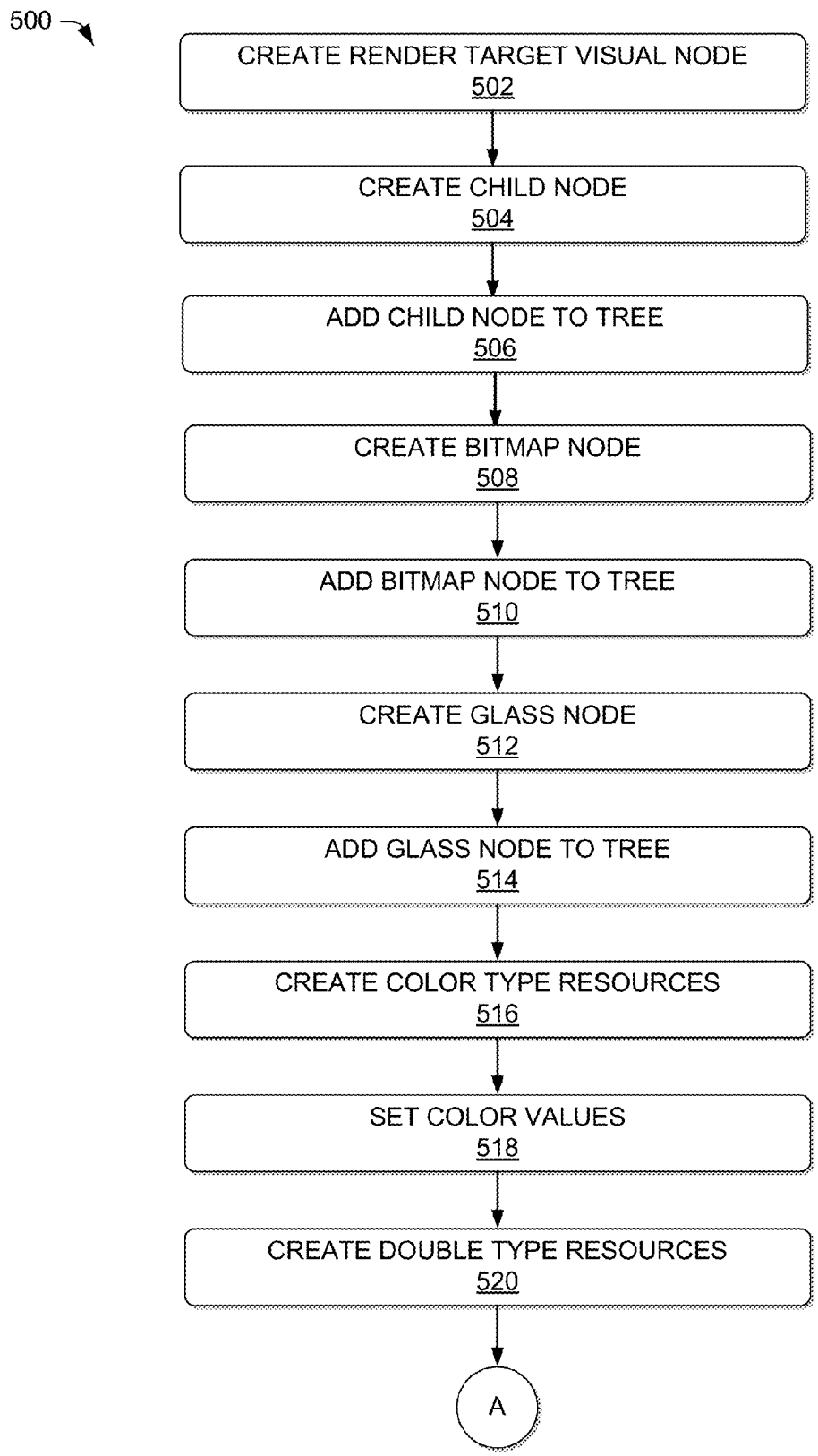
FIG. 5 and FIG. 6 show a flow diagram of an illustrative process of testing layered geometry rendering for a glass-over-bitmap scenario.
Figure 6:
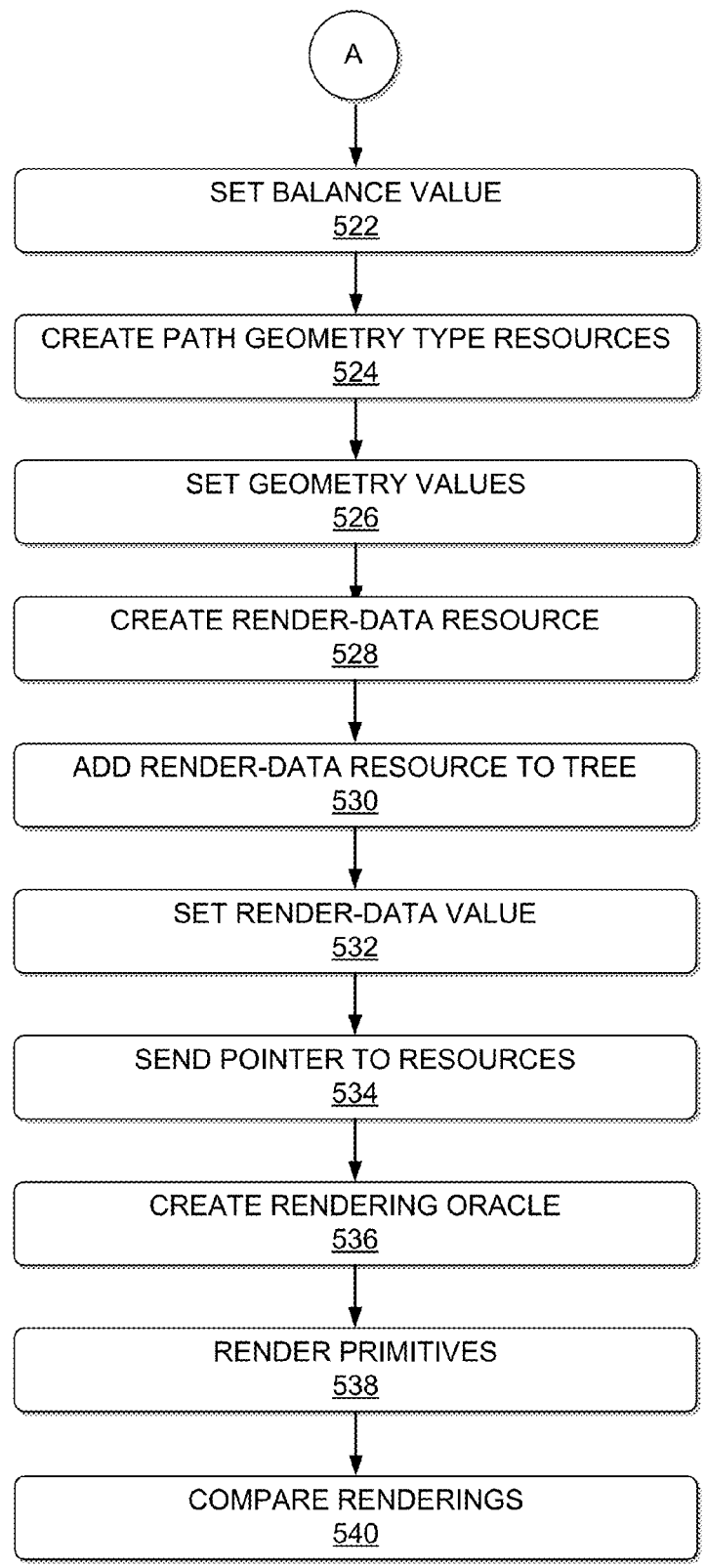

FIG. 4, FIG. 5, and FIG. 6 illustrate example processes for implementing Tool-based testing of composited systems as described herein. These processes are illustrated as collections of blocks in logical flow graphs, which represent a sequence of operations that can be implemented in hardware, software, or a combination thereof. In the context of software, the blocks represent computer-executable instructions on one or more computer-readable media that, when executed by one or more processors, cause the processors to perform the recited operations.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Note that the order in which the processes are described is not intended to be construed as a limitation, and any number of the described process blocks can be combined in any order to implement the processes, or alternate processes. Additionally, individual blocks may be deleted from the processes without departing from the spirit and scope of the subject matter described herein. Furthermore, while the processes are described with reference to the test suite 102 and/or computing device 106 described above with reference to FIG. 1, in some embodiments other computer architectures including cloud-based architectures may implement one or more portions of these processes, in whole or in part.

FIG. 4 illustrates an example process 400 for testing creating a rendering of a bitmap. In various implementations, a "glass-over-bitmap" tool, which represents an overlap of some bitmap and some glass geometries, is represented as a combination of a bitmap tool and a glass tool.

In the illustrated process, at 402 a bitmap tool creates an instance of core-bitmap artifact, and at 404 the bitmap tool creates an instance of draw-bitmap-instruction artifact class. At 406, the bitmap tool creates instances of the common resource classes, core-visual artifact and core-render-data artifact consistent with the discussion of FIG. 3.

At 408 the bitmap tool initializes each of these classes/artifacts with values that a dynamic linked library for a desktop compositor, such as DWMCore.dll, uses to create bitmap resource 340. For example, this initialization includes the bitmap tool setting pixel colors of the bitmap, which bitmap tool can do by generating patterns to isolate and expose issues with the rendering layer. For example, vertical and horizontal stripes can effectively demonstrate issues with glass rendering from too much or not enough filtering applied by each of the linearly separated convolutions that when combined form the glass blur.

At 410 the bitmap tool class executes functions of the resource classes discussed regarding FIG. 3 to identify and send appropriate commands to set the render data.

In some implementations, at 412, the bitmap tool class executes functions of the resource classes discussed regarding FIG. 3 to identify and send appropriate commands to cause rendering of the bitmap, such as on a desktop 126. In other implementations, the operation shown at 412 may optionally be performed to cause rendering for human intervention, such as when an error exceeds a threshold identifying a humanly perceptible difference.

The glass-over-bitmap tool represents a tool combinator that takes the bitmap tool and the glass tool as input and uses the visual tree constructs to combine the bitmap tool and the glass tool together in a way that is meaningful for testing. Similarly, other tool combinators expose composition properties. These tool combinators can correct for overlapping of transparent content or of visual transformations such as translation, scale, color transforms, etc. of composition primitives such as bitmaps or rectangles with a solid color brush.

FIG. 5 and FIG. 6 represent a flow diagram of an illustrative process 500 of testing a layered geometry rendering using the glass over bitmap example. The process 500 may be an extension of the process 400 described with reference to FIG. 4. For example, FIG. 4 illustrates a process of rendering a bitmap on a class level, and FIG. 5 illustrates a flow chart of rendering and verifying a glass over bitmap scenario. The order of operations is not intended to be construed as a limitation. Moreover, in various implementations any number of the described process blocks can be combined in any order to implement process 500, or alternate processes. Additionally, various blocks may be deleted from process 500 without departing from the spirit and scope of testing layered geometry rendering as described herein in the illustrated or alternate scenarios.

At 502, the resource model 122 creates a render-target visual. The render-target visual may be considered the root node of a visual tree.

In some embodiments at 504, the resource model 122 uses a class to create a visual node 304. In the illustrated example, resource model 122 uses a visual artifact class, such as CoreVisualArtifact class, to create a visual 304.

In embodiments employing the visual node 304, at 506 the resource model 122 uses a class to add the visual node 304 to the visual tree as a child of the render-target visual node 302. In the illustrated example, resource model 122 uses a tree builder class, such as VisualTreeBuilder class, to add the created visual 304 to the visual tree as a child of the render target visual 302.

At 508, the resource model 122 may use a class to create a node for the bitmap. Note that a render target can be considered a base layer of a composite for rendering. For example, resource model 122 may use a visual artifact class to create a visual node corresponding to a bitmap representing a desktop background.

At 510, the resource model 122 may use a class to add the node for the base layer of the composite for rendering to the visual tree. For example, resource model 122 may use a tree builder class to add the created bitmap visual to the visual tree as a child of the created visual 304.

At 512, the resource model 122 may use a class to create a node for a next layer of a composite for rendering. For example, resource model 122 may use the visual artifact class to create a visual node corresponding to a glass representing a glass layer for rendering.

At 514, the resource model 122 may use a class to add the node for the next layer of the composite for rendering to the visual tree. For example, resource model 122 may use a tree builder class to add the created glass visual to the visual tree as a child of the created visual 304.

At 516, the resource model 122 may use another class to create a variety of resources 310 of various types 312 to which the visuals refer. For example, resource model 122 may use a color artifact class, such as CoreColorArtifact class, to create color-type resources 314 for glass color 316 and afterglow color 318.

At 518, the resource model 122 may use another class to set color values. For example, resource model 122 may use the color artifact class to set the value for the glass color and afterglow resources by sending a set-content command.

At 520, the resource model 122 may use another class to create combination resources. For example, the resource model 122 may use a double artifact class, such as CoreDoubleArtifact class, to create double-type resources 320 to balance glass color 322, balance afterglow 324, and balance blur 326.

At 522, the resource model 122 may use another class to set the balance values. For example, the resource model 122 may use a double artifact class to set values for the glass color balance, afterglow balance, and blur balance resources by sending a set-content command.

At 524, the resource model 122 may use another class to create geometry type resources according to rendering regions. For example, the resource model 122 may use path geometry class, such as CorePathGeometryArtifact class, to create path geometry type resources 328 for glass geometries in various regions such as region-1 330, region-2 332, region-3 334, and region-N 336.

At 526, the resource model 122 may use another class to set values for geometries according to region. For example, the resource model 122 may use the path geometry class to set the value for the glass geometries according to region by sending a set-content command.

At 528, the resource model 122 may use another class to create a resource type for rendering data. For example, the resource model 122 may use a render data class, such as CoreRenderData class, to create the resource renderdata 338, which will be used to render glass.

At 530, the resource model 122 may use another class to add the resource type for rendering data to the visual tree. For example, the resource model 122 may use a builder class, such as RenderDataBuilder class, to add resource renderdata 338 and 342 to the visual tree.

At 532, the resource model 122 may use another class to set a value for rendering data. For example, the resource model 122 may use a visual artifact class to set the render-data resource 338 on the glass visual 308 by sending a set-content command.

At 534, the resource model 122 may use another class to send a command pointing to resources. For example, the resource model 122 may use the render data artifact class to send a command with pointers to resources 310 and 340 in order to render glass and a bitmap, respectively.

At 536, tools 124 create a rendering oracle. For example, a tool providing for glass over a bitmap, such as GlassOverBitmapTool, creates the rendering of the bitmap blurred by the glass geometries, which can be thought of as an expected rendering. The resource model 122 may use another class so that a dynamic linked library for a desktop compositor, such as DWMCore.dll, renders the primitives, which will be used to initialize the oracle with a test image.

At 538, the resource model 122 may use another class so that a dynamic linked library for a desktop compositor such as DWMCore.dll renders the primitives, which can be thought of as an actual rendering. For example, resource model 122 may use the render data artifact class to send a render-data command and a bitmap instruction class, such as DrawBitmapInstructionArtifact class, to send a draw-bitmap command with a pointer to the bitmap resource 340.

At 540, the tools compare the rendering by DWMCore.dll with the rendering generated as part of the oracle. For example, comparison of the rendering by a dynamic linked library for a desktop compositor, such as DwmCore.dll, can be compared with the rendering generated by the oracle on a per-pixel basis. In some implementations, the colors at various pixels are converted to a system that is close to the human vision, such as CIELab. The colors can then be compared to confirm whether they match. In some implementations, when the analysis indicates that the colors do not match, the tools determine whether the difference is beyond the threshold value. When the difference exceeds the threshold value, an error or a bug is indicated, and a bug report can be generated. In some implementation, the comparison to the threshold value can be performed without first checking for a match.

Conclusion

Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A system for validating output of a composited system in a test suite, the system comprising:
   one or more processing devices;
   a memory; and
   one or more modules stored on the memory and executable by the one or more processing devices to:
      communicate with a shared library for a desktop compositor directly by forming a dedicated channel with the shared library and creating a render target after the dedicated channel is formed;
      render primitives by adding nodes to a visual tree, where the created render target acts as a root of the visual tree;
      generate a graphics oracle to predict a rendering; and
      compare composition or rendering primitives against the graphics oracle based on at least a portion of the visual tree; and
      output error information if the comparison produces a result greater than a threshold of human perception.

2. The system as recited in claim 1, wherein the shared library for the desktop compositor comprises a DWMCore.dll file.

3. The system as recited in claim 1, wherein the one or more modules are further executable by the one or more processing devices to create render data and other resources corresponding to each visual node and send instructions to render the primitives according to the visual tree.

4. The system as recited in claim 1, wherein the system includes a plurality of tools configured to expose a different corresponding composition or rendering property.

5. The system as recited in claim 1, wherein the one or more modules are further executable by the one or more processing devices to isolate and expose issues arising in a rendering layer.

6. The system as recited in claim 1, wherein the one or more modules are further executable by the one or more processing devices to generate the graphics oracle in near real time.

7. The system as recited in claim 1, wherein the threshold of human perception comprises a threshold of human perception of colors.

8. The system as recited in claim 1, wherein comparison of the rendered primitives against the graphics oracle separate from operations of a resource model.

9. The system as recited in claim 1, wherein the one or more modules are further executable by the one or more processing devices to:
   create scenarios using an algebraic structure of tools and tool combinators and the visual tree; and
   define composition and rendering properties of the created scenarios.

10. A computer storage device having computer-executable instructions recorded thereon, the computer-executable instructions to configure a computer to perform acts comprising:
    forming a dedicated channel with a shared library for a desktop compositor;
    creating a render target after the dedicated channel has been formed;
    rendering primitives by adding nodes to a visual tree, where the render target acts as root of the visual tree;
    generating a graphics oracle to predict a rendering;
    comparing composition or rendering primitives against the generated graphics oracle based on at least a portion of the visual tree; and
    outputting error information if a result of the comparison is greater than a predefined threshold.

11. The computer storage device as recited in claim 10, the operations further comprising exposing, by each of a plurality of tools, a different corresponding composition or rendering property.

12. The computer storage device as recited in claim 10, the operations further comprising using visual tree constructs to combine input tools to isolate and expose issues arising in a rendering layer.

13. The computer storage device as recited in claim 10, the acts further comprising at least one of:
    creating render data and other resources corresponding to each visual node; or
    sending drawing instructions to render the primitives according to the visual tree.

14. The computer storage device as recited in claim 10, the acts further comprising validating the composition or the rendering primitives against the graphics oracle separate from operations of a resource model.

15. The computer storage device as recited in claim 10, wherein generating the graphics oracle comprises creating scenarios indirectly using an algebraic structure of tools and tool combinators.

16. The computer storage device as recited in claim 10, wherein the predefined threshold is associated with human perception.

17. A method of testing composition and rendering primitives, the method performed at one or more processing devices, the method comprising:
    at a resource model,
       adding nodes to a visual tree;
       creating render data corresponding to each node;
       sending instructions for rendering primitives associated with the created render data; and
    at a tool component,
       defining composition and rendering properties of a shared library for a desktop compositor using an algebraic structure of tools and tool combinators and components of the visual tree;
       deriving resource models based on the defined composition and rendering properties;

testing composition and rendering primitives by comparing the derived resource models to the composition and rendered primitives;
forming an expected rendering using the derived resource models;
comparing a difference between selected pixels of the expected rendering and an actual rendering associated with the rendered primitives; and
outputting at least one of an error report or a bug report, if the compared difference is greater than a predefined threshold.

18. The method as recited in claim 17, wherein the predefined threshold is associated with human perception.

* * * * *